(12) United States Patent
Quadflieg et al.

(10) Patent No.: US 6,585,299 B1
(45) Date of Patent: Jul. 1, 2003

(54) PIPE CONNECTOR

(75) Inventors: Erich Quadflieg, Krefeld (DE); Gerhard Krug, Duisburg (DE); Friedrich Lenze, Ratingen (DE); Martin Schlüter, Düsseldorf (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/486,934

(22) PCT Filed: Aug. 6, 1998

(86) PCT No.: PCT/DE98/02318

§ 371 (c)(1), (2), (4) Date: Mar. 27, 2000

(87) PCT Pub. No.: WO99/11963

PCT Pub. Date: Mar. 11, 1999

(30) Foreign Application Priority Data

Sep. 3, 1997 (DE) .......................................... 197 39 458

(51) Int. Cl.⁷ ................................................ F16L 35/00
(52) U.S. Cl. .................... 285/333; 285/219; 285/334
(58) Field of Search ................................ 285/333, 334, 285/219

(56) References Cited

U.S. PATENT DOCUMENTS

| | | | | |
|---|---|---|---|---|
| 2,885,225 A | * | 5/1959 | Rollins | 285/115 |
| 3,079,181 A | * | 2/1963 | Van Der Wissel | 285/333 |
| 3,210,096 A | * | 10/1965 | Van Der Wissel | 285/115 |
| 4,346,920 A | * | 8/1982 | Dailey | 285/89 |
| 4,582,348 A | * | 4/1986 | Dearden et al. | 285/175 |
| 4,629,222 A | * | 12/1986 | Dearden et al. | 285/332.4 |
| 4,629,223 A | * | 12/1986 | Dearden et al. | 285/334 |
| 6,155,613 A | * | 12/2000 | Quadflieg et al. | 285/334 |

FOREIGN PATENT DOCUMENTS

GB 2234308 A * 1/1991 ................. 285/334

* cited by examiner

*Primary Examiner*—J. J. Swann
*Assistant Examiner*—Carlos Lugo
(74) *Attorney, Agent, or Firm*—Cohen, Pontani, Lieberman & Pavane

(57) ABSTRACT

A pipe joint with a sleeve element, which has an internal thread, and with a spigot element, which has an external thread which can be screwed to said internal thread. One element has a constant pitch throughout and the other element, with two sections extending in each case from the ends of the threaded length is likewise provided with a constant pitch. The other element has more than two sections with a pitch which is constant within the section but is different from the first-mentioned element, it being the case that the pitch difference at least of one section is in the opposite direction, in terms of sign, to the rest of the sections. The pitch difference of one section is at least double that of the adjacent sections and in the screwed-together position, in the section with the large pitch difference, the thread play and the thread tolerances are compensated and the load flank of one corner tooth of this section, with the guide flank of the other corner tooth, produces the basic bracing. The two adjacent sections, with their load and/or guide flanks, build up the thread bracing until the desired thread torque has been reached.

13 Claims, 8 Drawing Sheets

PIPE CONNECTOR

PRIORITY CLAIM

This is a U.S. national stage of application No. PCT/DE98/02318, filed on Aug. 06, 1998. Priority is claimed on that application and on the following application:
Country: Germany, Application No.: 197 39 458.2, Filed: Sep. 03, 1997.

BACKGROUND OF THE INVENTION

1. Field of the Invention

The invention relates to a pipe joint having a sleeve element and a spigot element.

2. Discussion of the Prior Art

Pipe joints serve for connecting tubular elements, for example to form pipelines, which deliver, in particular, pressurized fluids, for example gas or oil. In the search for oil or gas, these pipe joints are also used in lengths of casing pipes or delivery pipes.

The pipe connections in question here are usually made using threads, an external thread on a spigot element and an internal thread in a sleeve element, which are screwed together. As far as the definitive positioning after the screwing-together operation is concerned, a distinction is drawn between pipe joints with a marking made on them and pipe joints which have an additional abutment element such as inner shoulder or outer shoulder. This shoulder element may additionally assume the function of a seal. The shoulder essentially comprises annular surfaces which are arranged, for example, at the free end of the spigot element and on the inside of the sleeve element and are pressed firmly one upon the other by the screwing-together operation. In the case of an inner shoulder, the spigot element is compressed between the shoulder and the thread and the sleeve element is expanded between the shoulder and the thread; In the case of an outer shoulder, the spigot element is expanded between the shoulder and the thread and the sleeve element is compressed between the shoulder and the thread. The sleeve and spigot stressing caused by the contact pressure in the shoulder is predominantly absorbed only by the small number of teeth at the end of the thread which are located adjacent to the shoulder surfaces. The remaining thread teeth are only subjected to an extremely small degree of loading. Accordingly, the loaded thread teeth are highly stressed. This high stressing in the thread is increased by external loading on the connections, in particular by axial tension and/or compression, but also by internal and external pressure and by bending, with the result that the overall stressing can reach a value which is greater than the permissible yield strength. Axial tension can eliminate the prestressing in the abutment, and thus its action can eliminate the positioning and sealing, and axial compression can result in plastic deformation in the shoulder region and, in the case of subsequent tensile loading, can render the positioning and sealing functions ineffective.

In order that the forces acting on the sealing surfaces (abutment) can be distributed as reaction forces over the largest possible number of thread teeth German reference, DE 34 31 808 A1 discloses a specially designed pipe joint. In this proposal, the pipe joint has an intermediate threaded section between the ends of the spigot thread and sleeve thread, in which the two elements have the same pitch. In the end sections, the pitches of the spigot thread and sleeve thread differ, to be precise in dependence on the position of the abutment. If the annular sealing surfaces (abutment) are located on the inside of the pipe, then the thread of the spigot element has a greater pitches than the thread of the sleeve element; if the sealing surface is located on the outside of the pipe, the opposite is true. The proposed arrangement is intended to make it possible for the reaction force originating from the abutment to be transmitted uniformly over the thread teeth. However, loading, such as axial compression and bending, is further introduced largely into the abutment, which is already prestressed to a considerable extent by the elements being screwed together. It is pointed out at the end of the description of the above-mentioned reference that the design explained above can also be used for a pipe joint with a multiple-start thread.

WO 96/07044 discloses a pipe joint in which the loading, such as axial compression and bending, is absorbed predominantly by the thread rather than solely by the abutment. For this purpose, one element, i.e. the spigot or sleeve, has a constant pitch throughout and the element screwed to it is provided with two sections which extend in each case from the ends of the threaded length and likewise have a constant pitch within the section, although this pitch is different from the first-mentioned element. The sections have an offset with respect to one another in the center, with the result that an in-contact narrow tooth or an excessively wide gap is produced in the transition region between the sections, and, outside the offset, the toothed gap in one element is wider than the tooth of the other element to the extent that the guide flank on one side of the offset is braced against the load flank on the other side of the offset, maximum bracing taking place in the center of the thread and decreasing toward the edges of the thread. This design is based on the fact that a difference in the causes the load flank in one threaded region to be braced against the guide flank in the same, or in another, region.

Extensive tests with this pipe joint have shown that the desired effect for bracing the load flank against the guide flank may, in unfavorable cases, be insufficient if there is unfavorable pairing of the differences produced during the production of the threads.

SUMMARY OF THE INVENTION

The object to the invention is to provide a pipe joint which can easily be produced and by means of which all external loading on the connection, in particular operating torques, axial compression and bending, is absorbed predominantly via the thread, even taking account of the differences, which are unavoidable during the thread production, from the ideal configuration, the axial tensile loading and internal compressive loading not being adversely affected.

Pursuant to this object, and others which will become apparent hereafter, one aspect of the present invention resides in a pipe joint comprising a sleeve element and a spigot element. One of the elements having a thread with a constant pitch and the other of the elements having more than two sections with a pitch which is constant within the section but different from the pitch of the one element. The pitch difference at least of one section is in an opposite direction, in terms of sign, to a remainder of the sections of the other element, and the pitch difference of one section is at least double that of the adjacent sections. In a screwed together position of the sleeve element and the spigot element, in the section with the large pitch difference the thread plate and the thread tolerances are compensated for and the load flank of one corner tooth of the large pitch different section produces the basic bracing together with the guide flank of the other corner tooth. The two adjacent sections build up the thread bracing with at least one of load and guide flanks until a desired thread torque is reached.

In the case of the pipe joint designed according to the invention, irrespective of whether the thread is a single-start thread or multiple-start thread, one element, preferably the spigot element has, in a known manner, a constant pitch extending over the entire threaded length; in the case of a multiple-start thread, said element has an identical, constant pitch. The great advantage of this is that a damaged spigot element can be recut by relatively simple means. If the sleeve element, which is of a special configuration and is technically very complex to produce, is damaged, it is exchanged. However, the idea of the invention likewise permits a special configuration of the spigot element. The idea of the invention can also be. readily applied to integral joints.

The design of the sleeve element is such that axial bracing is achieved within the thread in the screwed-together position. For this purpose, the sleeve element preferably has more than two sections with a pitch which is constant within the section but is different from the spigot element, it being the case that the pitch at least of one section is in the opposite direction to the rest of the sections and the pitch difference of one section is at least double that of the adjacent sections. This achieves the situation where in the screwed-together position, in the section with the large pitch difference, the thread play and the thread tolerances are compensated and the load flank of one corner tooth of this section, with the guide flank of the other corner tooth, produces the basic bracing. The two adjacent sections, with their load and/or guide flanks, build up the thread bracing until the desired thread torque has been reached.

It has proven particularly favorable if the sleeve element has four sections, of which one section has a smaller pitch than the spigot element screwed thereto, and the three successive sections have a greater pitch than the spigot element screwed thereto, the lead of the spigot element serving as the reference pitch. This previously described arrangement applies, in general, to the arrangement of both an interior and/or exterior abutment. By way of the section with the smaller pitch, the load-flank backlash is eliminated, or vastly reduced, in the direction of the thread end.

According to the invention, the extent of the individual sections is also important. Optimum values are achieved when the section with at least a double pitch difference extends at least over three, preferably over four, helixes and the two adjacent sections extend over two or more helixes. The section located in the end region extends at least over three helixes.

The thread may be designed to be conical or inclined in any desired manner. The tooth shape itself is of minor importance. The design of the threaded connection according to the invention achieves the desired effect in terms of the bracing and the associated distribution of the loading over a plurality of thread helixes, also taking into account the tolerances during the thread production.

BRIEF DESCRIPTION OF THE DRAWINGS

An exemplary embodiment of the pipe joint designed according to the invention is explained in more detail in the drawing, in which.

DETAILED DESCRIPTION OF THE PREFERRED EMBODIMENTS

Figure 1:
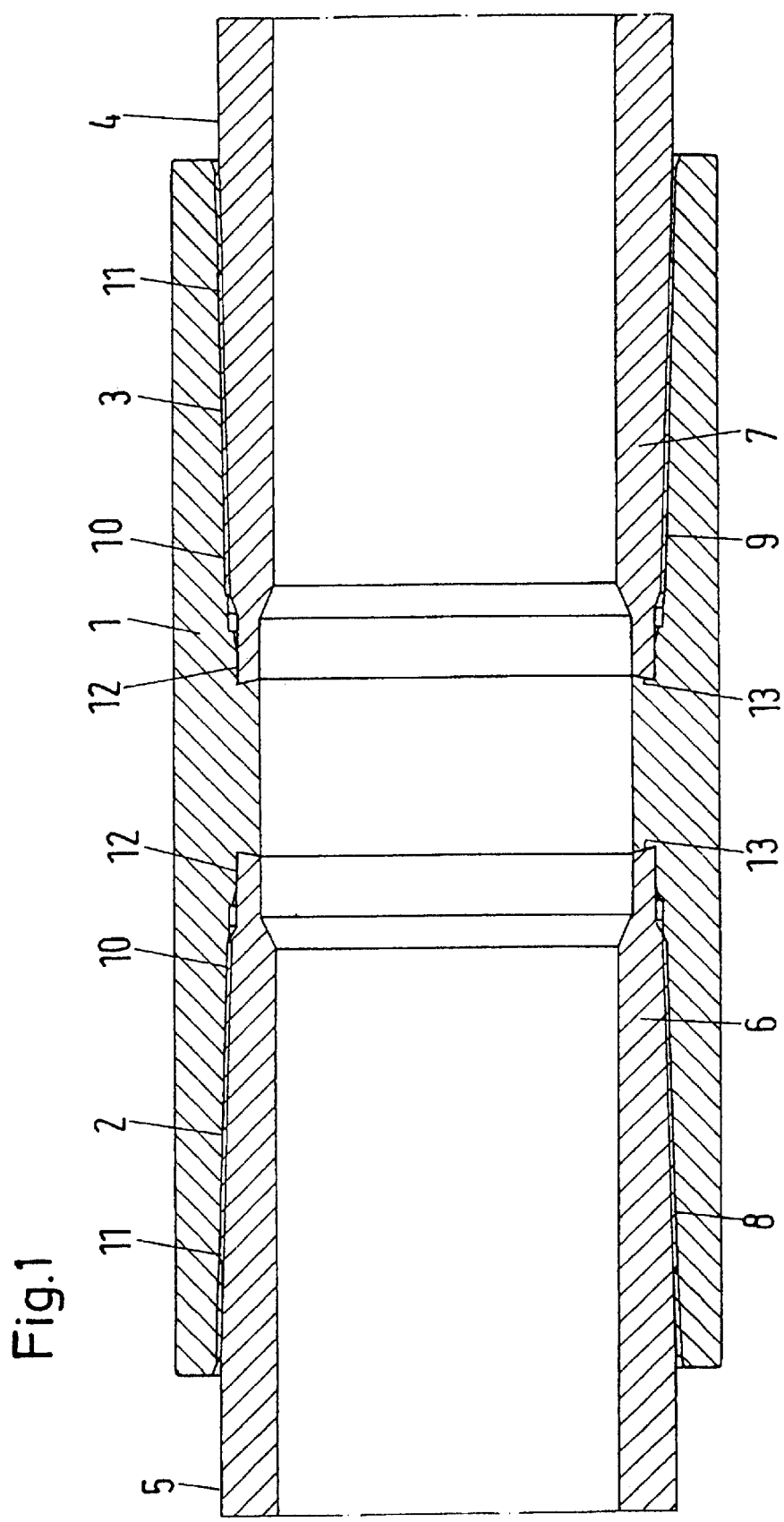
FIG. 1 shows a longitudinal section through a pipe joint with a sleeve.
Figure 2:
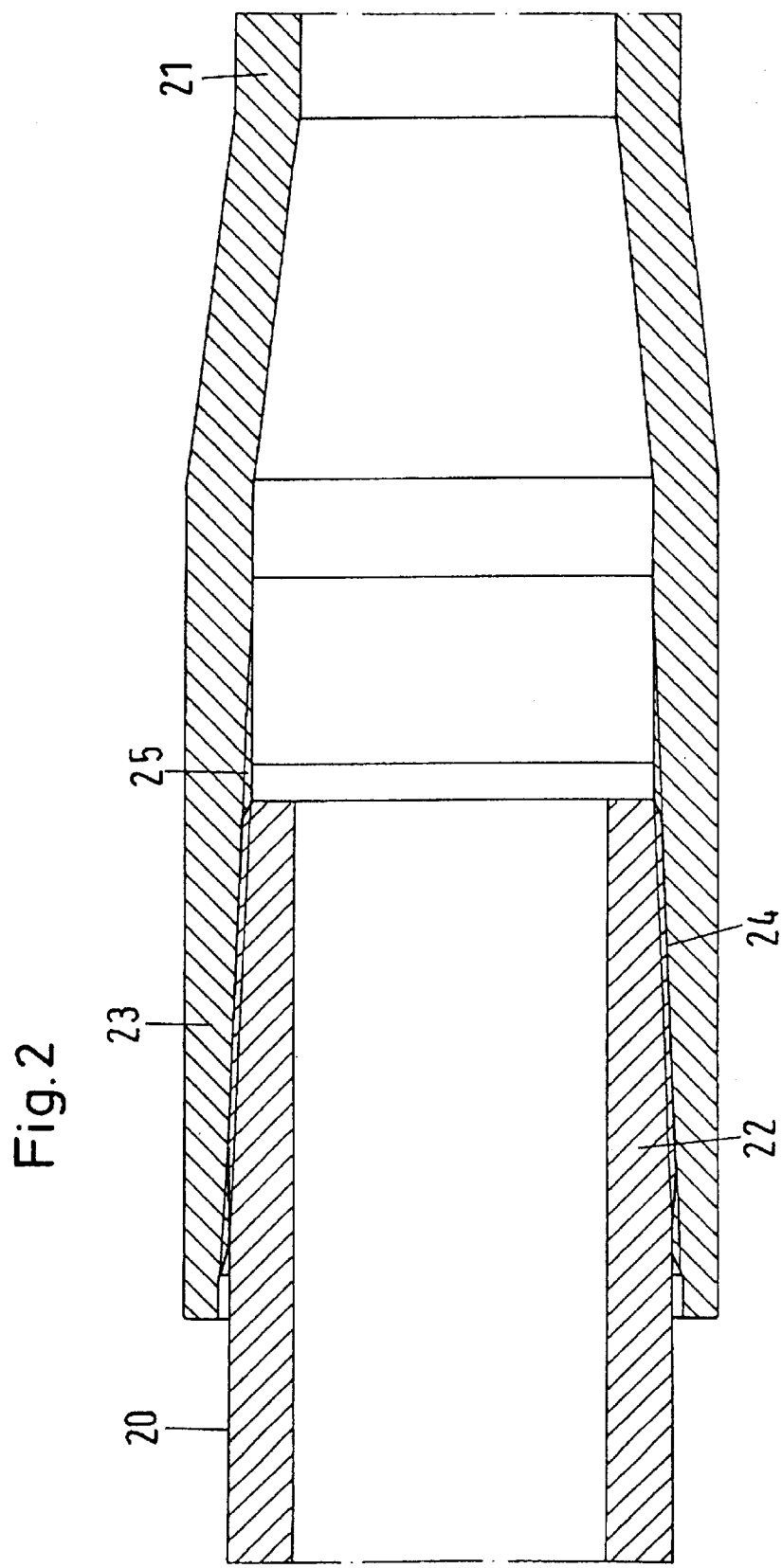
FIG. 2 shows a longitudinal section through a pipe joint in the form of an integral connections.

FIGS. 1 and 2 illustrate pipe joints in a longitudinal section, to be precise. FIG. 1 illustrates a pipe joint with a sleeve and FIG. 2 illustrates a pipe joint in the form of an integral connection. The first-mentioned pipe joint comprises a sleeve 1, which is provided with two conically designed threaded sections 2, 3 and, in the central region, has on both sides in each case a sealing seat 12 and an abutment 13. The details of the sealing seat 12 and the abutment 13 are not illustrated here since they are not essential to the invention. The two pipes 4, 5 which are to be connected are designed in the end region as a spigot element 6, 7 and have threaded sections 8, 9, which are complementary to the thread of the sleeve 1 and are likewise of conical design. The numeral 10 indicates the spigot-face thread end and the numeral 11 indicates the sleeve-face thread end. In contrast to FIG. 1, the sleeve is dispensed with in the integral connection illustrated in FIG. 2. The two pipes 20, 21 which are to be connected are designed as a spigot element 22 at one end and a sleeve element 23 at the other end. The two elements 22, 23 each have a threaded section 24, 25 of mutually complementary conical design. The abutment and sealing seat have not been illustrated.

Figure 3:
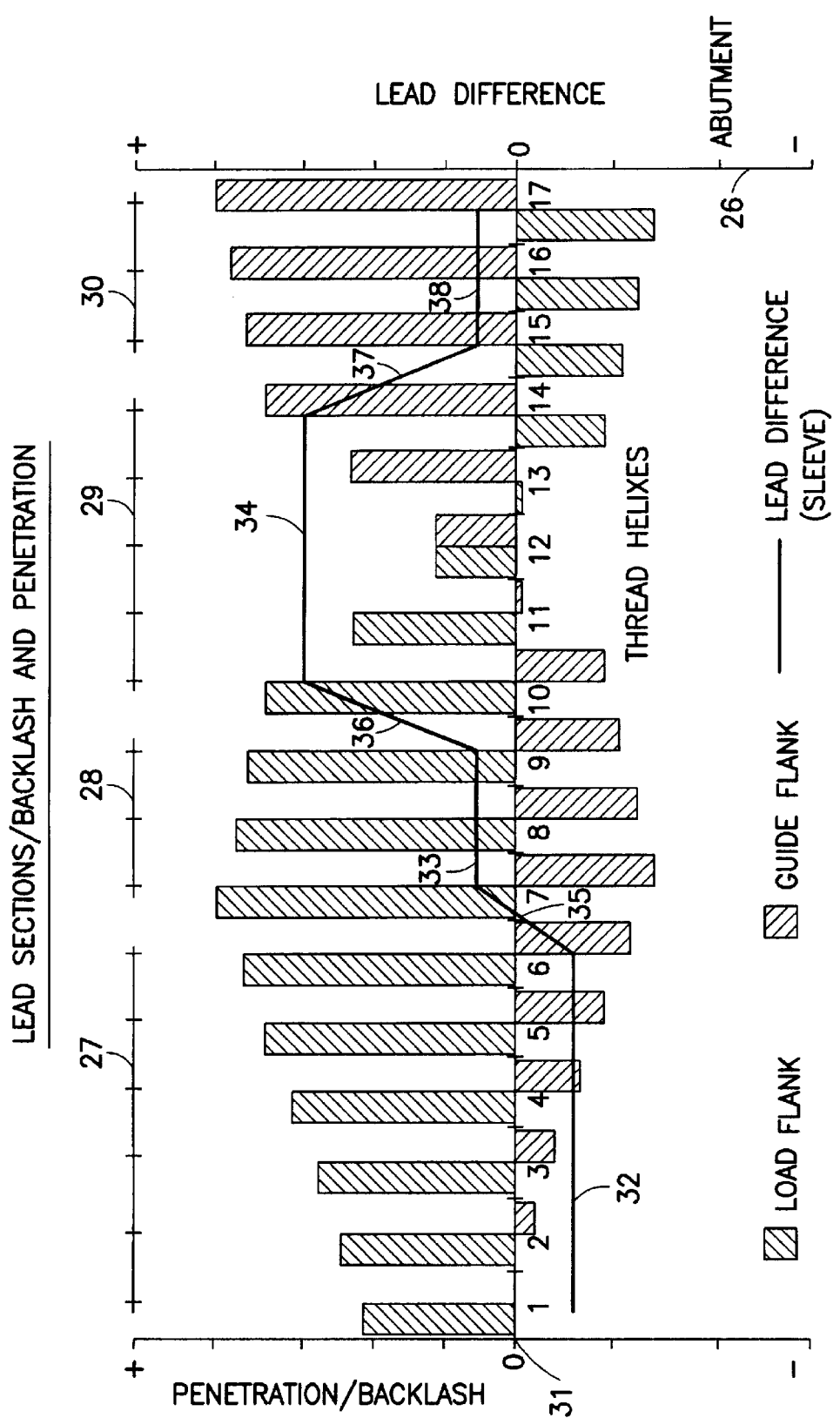
FIG. 3 shows a diagram with pitch sections and associated flank backlash and axial penetration achieved by superposing the geometries of the spigot and sleeve threads.
Figure 3A:
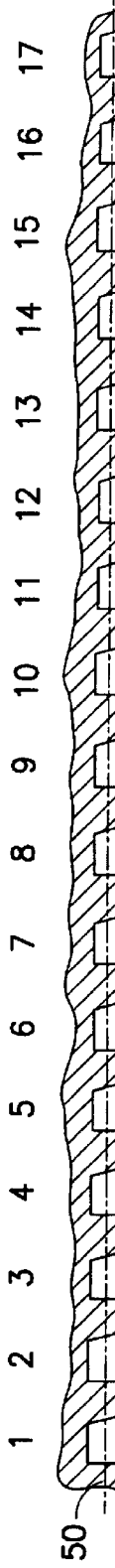
FIG. 3a is a partial cross-sectional view of a sleeve thread according to the present invention.
Figure 3B:
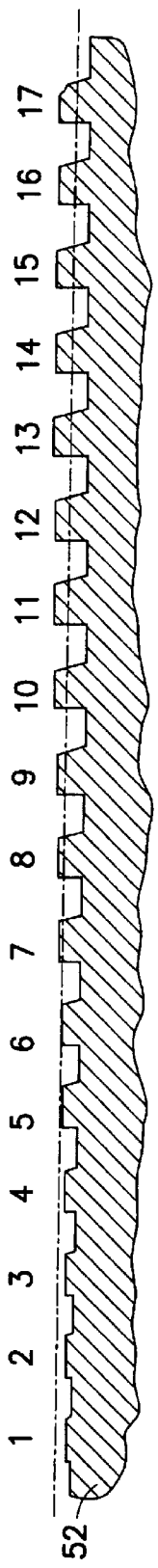
FIG. 3b is a partial cross-sectional view of a sleeve thread according to the present invention.
Figure 3C:
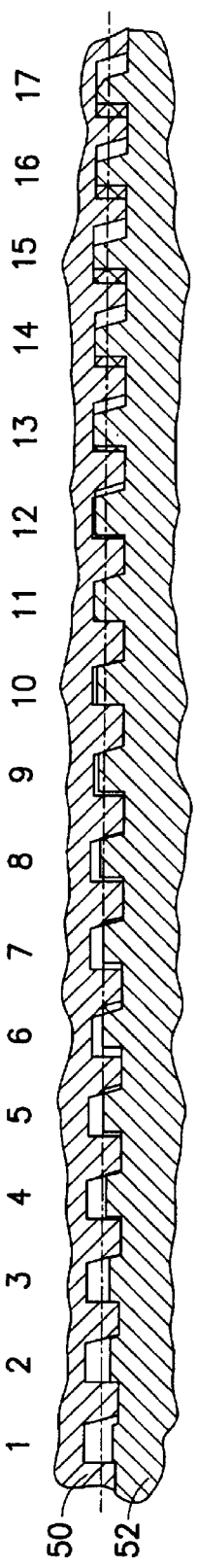
FIG. 3c is a partial cross-sectional view of the sleeve thread of FIG. 3a and the spigot thread of FIG. 3b shown in the threaded-together position.
Figure 4:
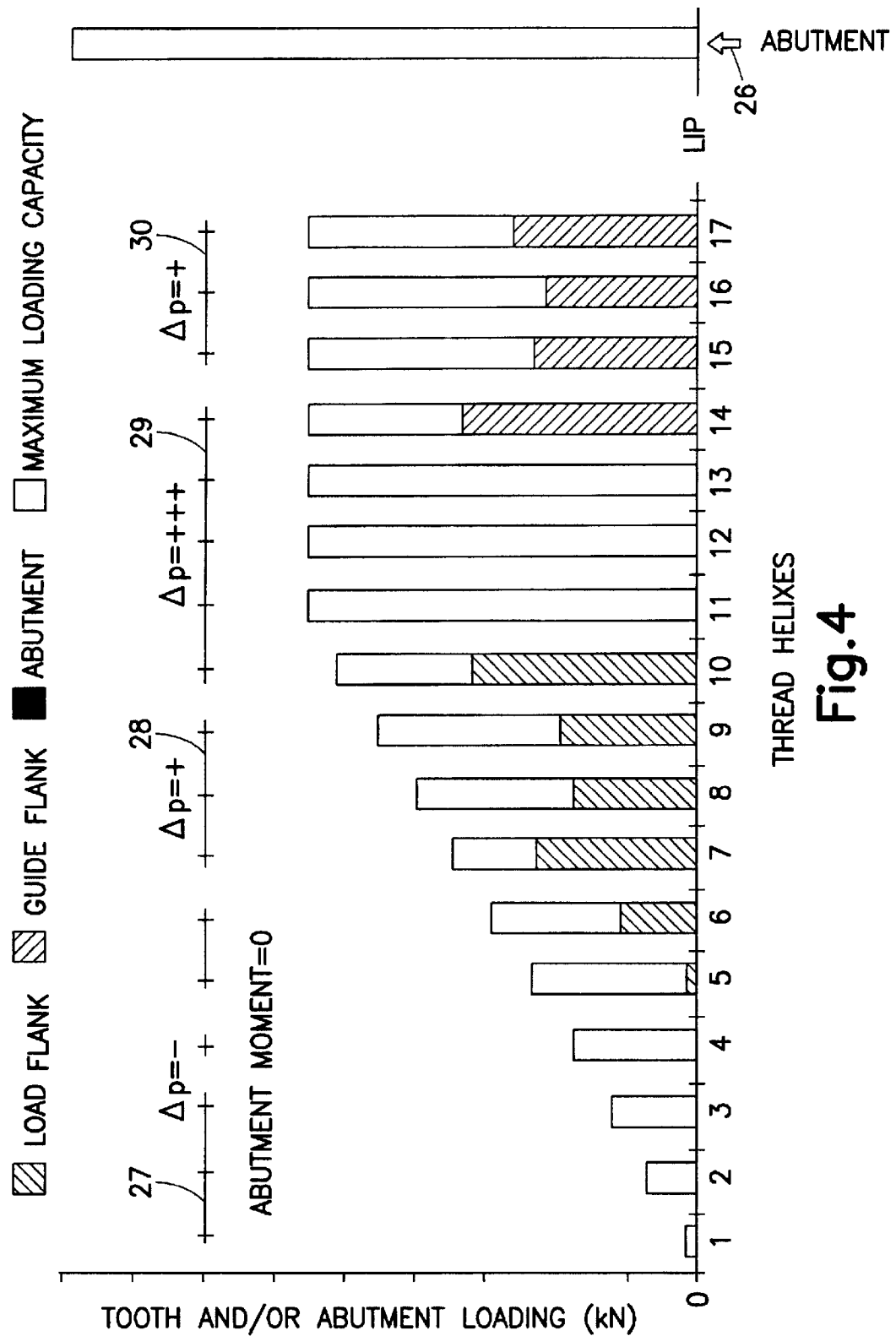
FIG. 4 shows a diagram of the calculated distribution of the tooth loads over the threaded length with maximum lead difference and minimum tooth play and an abutment moment equal to zero.

FIGS. 3a, 3b, and 3c show an embodiment of a sleeve 50 and a spigot 52 with sections of different pitch. The sleeve 50 and spigot 52 shown in FIGS. 3a, 3b, and 3c may be any of the sleeve and spigot combinations shown in FIGS. 1 and 2.

FIG. 3 illustrates in a diagram, by way of example, for the embodiment including the sleeve and spigot of FIGS. 3a, 3b, and 3c, the sections with different pitches, designed according to the invention, the pitch progression in the sleeve and the associated flank backlash (+) and the axial penetration (−) which are achieved by superposing the spigot and sleeve threads. The backlash of the load and guide flanks and the axial penetration for the individual thread helixes are plotted for the selected example, with an overall threaded length of 17 thread helixes. In this case, the dark hatching indicates the load flank and the lighter hatching indicates the guide flank, the flank backlash being marked in the positive region of the y-axis and the axial penetration being marked in the negative region thereof. The sections designed according to the invention are given individually at the top of the diagram, beginning on the left-hand side, i.e. on the side which is directed away from the abutment 26, with a first section 27, which extends over a total of six thread helixes. This is adjoined by a second section 28, with an extent of three thread helixes. This is followed by a third section 29, with an extent of five thread helixes, and a fourth and last section 30, with an extent of three thread helixes. This is usually followed by a short thread-free section (see also FIG. 1 in this respect) which is adjoined by the metallic sealing seat (abutment 26). The thick, solid line indicates, for the sleeve, the pitch difference in the individual sections 27–30 in relation to the spigot thread, which has a constant pitch over the entire threaded length, represented here by the zero line 31. In the first section 27, the pitch is smaller than that in the spigot thread, which is indicated here by a line 32, which is located beneath the zero line 31. In the following, second section 28, the pitch is greater than in the spigot thread. The corresponding line 33 is located above the zero line 31. In contrast to the known prior art, there is no change into the negative region in the third section 29; rather, there is a jump to an even larger pitch difference in relation to the spigot thread. This is made clear by the level of the line 34. In the fourth section 30, there is a drop again to the starting value of the second section 28. This line 38 is likewise located above the zero line 31, which means that the pitch is greater than in the spigot thread. The transitions between the individual sections 27–30 are theoretically rectangular, but the production does not allow such an abrupt change from one pitch to a different value, this resulting in a smooth transition. For this reason, the transitions 35–37 are illustrated in the form of sloping lines. If one looks at the progression of the backlash of the load and guide flanks and of the axial penetration, then it can be seen that, in the transition between the first section 27 and the second section 28, the values tend toward a maximum value, in order to achieve a minimum in the center of the third section 29. There is then a change in sign of the backlash of the load and guide flanks and axial penetration, and the values rise again in the direction of the abutment 26.

If one takes into account the deformation originating, during the screwing-together operation, essentially from the compensation of the axial penetration, then corresponding tooth loading is produced on the tooth flanks. For this purpose, the following FIGS. 4–7 illustrate, for a selected example, the respective distribution of the tooth loads over the threaded length with maximum lead difference and minimum tooth play, and also illustrate the abutment loading in dependence on abutment moment, additional axial tensile load and additional axial compression.

In this case, the blank columns illustrate the maximum loading capacity for the respective tooth in the complete thread and at the end of the thread and for the abutment, the dark hatching illustrates the loading of the load flank and the light hatching illustrates the loading of the guide flank. The respective abutment loading is depicted in solid color. The pitch differences for the individual sections 27–30 are specified at the top of the diagram. It should be noted here that the pitch difference between the first section 27 and the second section 28 is approximately equal, but in the opposite direction. The third section 29 has a pitch difference which is a number of times greater than the two adjacent sections 28, 30. For the first part image according to FIG. 4, it is assumed that the abutment moment is intended to be zero and the thread is not subjected to any additional tensile loads or compression. As a result, the teeth of the last thread helixes (14–17) are loaded to approximately the same extent as far as the load flanks are concerned. The teeth of the first thread helixes (1–6) at the end of the thread are only subjected to a small amount of loading, if any at all, as are the three thread helixes (11–13) in the third section 29.

Figure 5:
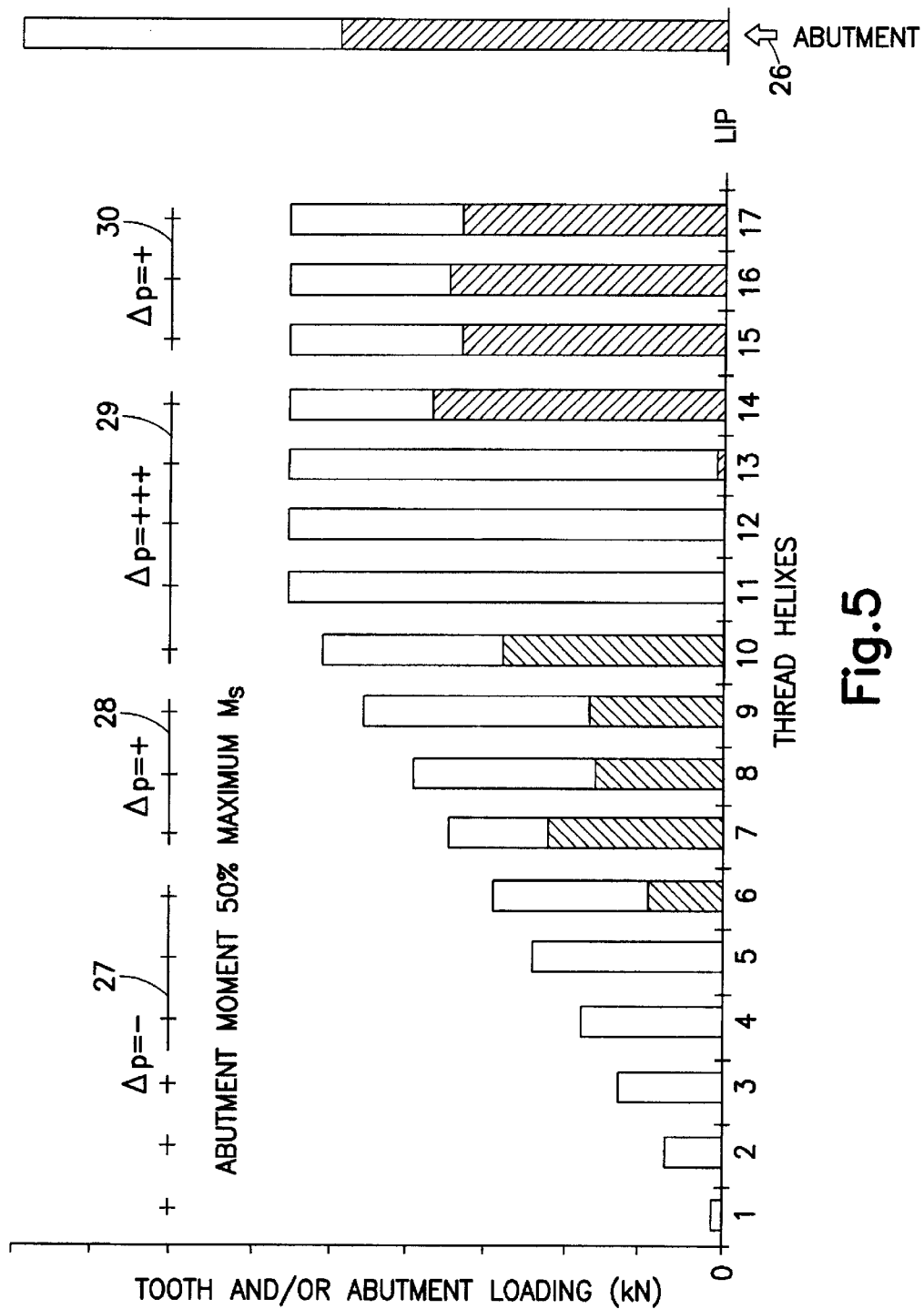
FIG. 5 shows the same as FIG. 4, but with an abutment moment equal to 50% of the maximum abutment moment.

In FIG. 5, the image changes only insignificantly if, in this example, the abutment 26 is subjected to an abutment moment of 50% of the maximum value. The teeth of the last thread helixes (14–17) are subjected to slightly higher loading in relation to the loading situation in FIG. 4. There is only a slight change in the overall distribution.

Figure 6:
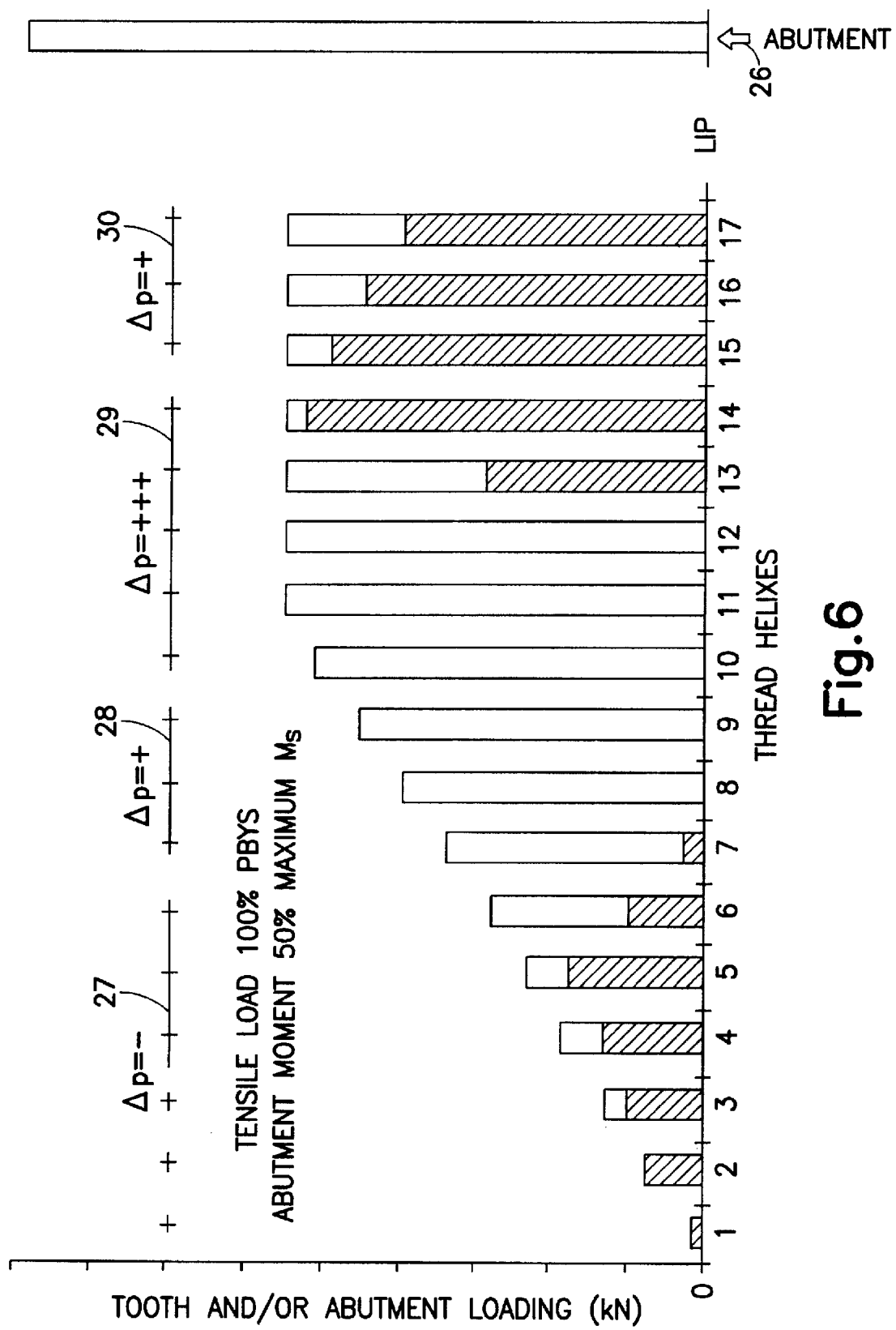
FIG. 6 shows the same as FIG. 5, but with an additional axial tensile load of 100% of the pipe body yield strength.
Figure 7:
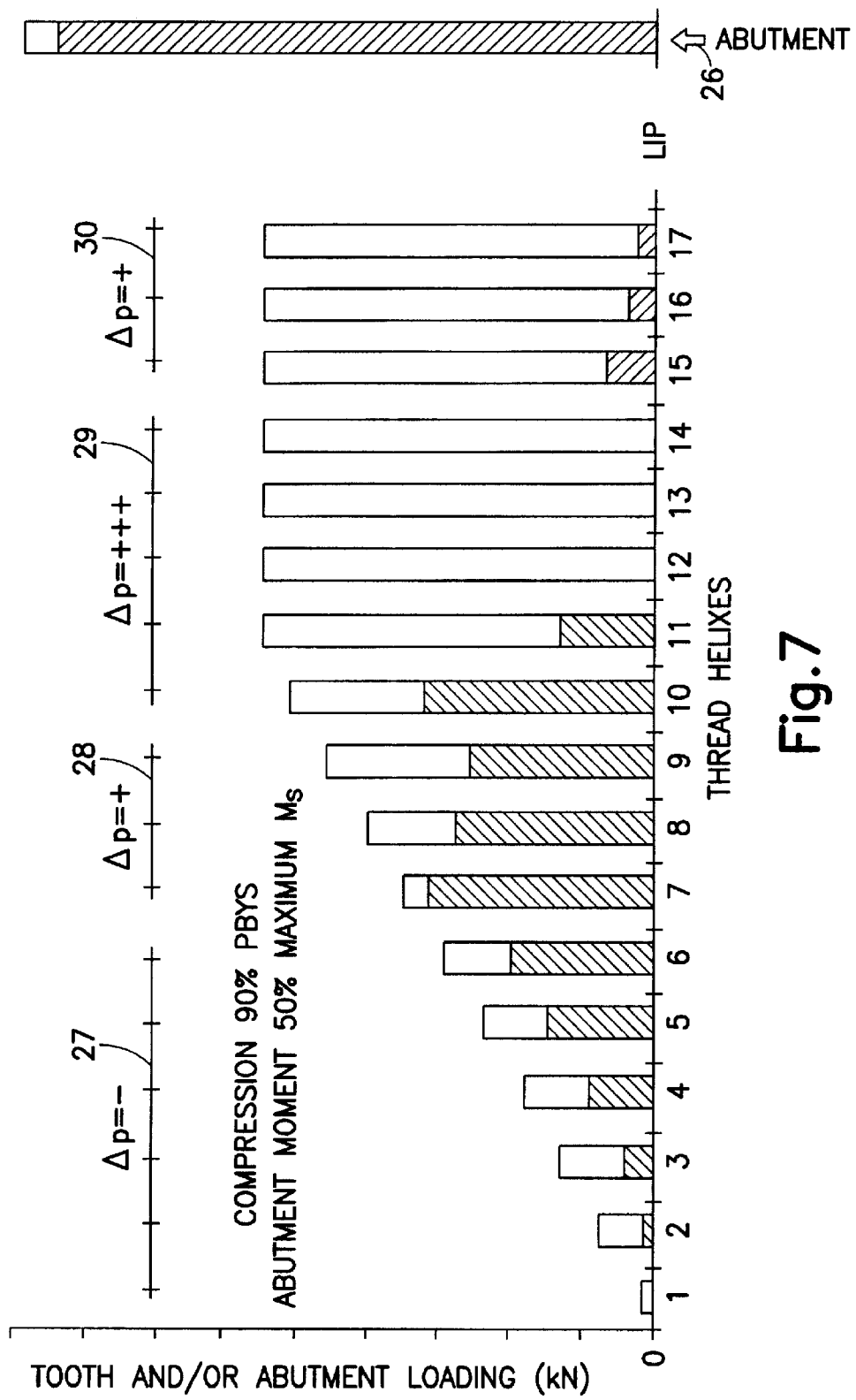
FIG. 7 shows the same as FIG. 5, but with an additional axial compression of 90% of the pipe body yield strength.

The relationships become quite different if, as is illustrated in FIG. 6, an axial tensile load at the level of the pipe body yield strength (100% PBYS=Pipe Body Yield Strength) is added to the abutment moment of 50% of the maximum value. In this case, as can be seen in this example, the abutment force is eliminated although an abutment moment of 50% of the maximum value is applied. In this case, the teeth of the last thread helixes (14–17) are subjected to high loading and also the helix (13) located in the third section 29 contributes to the distribution of the overall loading. Some of the teeth of the first thread helixes (1–6) are also loaded to the limit. The tensile load calculated here should correspond to 100% PBYS (Pipe Body Yield Strength). This means that, with additional axial tensile loads, corresponding to the yield point of the pipe body, the loading of the teeth is within the permissible loading ranges.

Image 7 shows distribution with additional axial compression (compressive loading). It is assumed here that the compression predetermined in this region corresponds to 90% of the yield point of the pipe body. Whereas, according to FIG. 6, with axial tensile loading, the abutment 26 is relieved of loading, compression loads the abutment 26 virtually as far as the permissible limit. The teeth of the last thread helixes (14–17) are likewise relieved of loading, whereas the teeth of the first thread helixes (1–6) and of the second section 28 and the initial region of the third section 29 are subjected to higher loading. It is also the case with this loading that the loading of the teeth is within the permissible range overall.

Invention is not limited by the embodiments described above which are presented as examples only but can be modified in various ways within the scope of protection defined by the appended patent claims.

What is claimed is:

1. A pipe joint comprising: a sleeve element which has an internal thread; and a spigot element which has an external thread which can be screwed into said internal thread, a first one of the elements having a constant pitch throughout and a second one of the elements having more than two sections with a pitch which is constant within the section but has a difference from the pitch of the first element, the pitch difference at least of one of the sections being opposite in sign to a remainder of the sections and the pitch difference of another of the sections being at least double the pitch difference of two sections adjacent the another section, the second element being configured so that when screwed into the internal thread of the first element thread play and thread tolerances are compensated in the double pitch difference section and a load flank of one corner tooth of the double pitch difference section produces a basic bracing with a guide flank of another corner tooth of the section, the two adjacent sections being configured to have load and guide flanks that build up thread bracing until a desired thread torque has been reached, wherein one of the spigot element and the sleeve element has a constant pitch throughout and a respectively other of the spigot element and the sleeve element has four sections with a pitch which is different, the pitch of one section of the four sections of the other element being opposite in sign to three remaining successive sections of the four sections, and a central section of the three successive sections having a pitch difference at least twice that of the adjacent sections.

2. A pipe joint as defined in claim 1, wherein the one section has a smaller pitch, and the three successive sections have a greater pitch than the one of the spigot element and the sleeve element screwed thereto.

3. A pipe joint as defined in claim 1, wherein the one section has a greater pitch, and the three successive sections have a smaller pitch than the one of the spigot element and the sleeve element screwed thereto.

4. A pipe joint as defined in claim 1, wherein the pitch difference of the one section and an adjacent section are substantially equal but opposite in sign.

5. A pipe joint as defined in claim 1, wherein, for arrangement of a metallic sealing seat on at least one of an inside and outside of a threaded connection of the two elements, a section located on an end side of the one element has a smaller pitch, and the three successive sections have a greater pitch, than the other element screwed thereto and the end side section extending over at least three helixes.

6. A pipe joint as defined in claim 1, wherein the spigot thread and the sleeve are designed as multiple start threads.

7. A pipe joint as defined in claim 6, wherein the spigot and sleeve threads are double-start threads.

8. A pipe joint as defined in claim 1, wherein the pitch difference between the two screwed-together elements is at least 0.0005 mm/inch and at most 0.4 mm/inch.

9. A pipe joint comprising: a sleeve element which has an internal thread; and a spigot element which has an external thread which can be screwed into said internal thread, a first one of the elements having a constant pitch throughout and a second one of the elements having more than two sections with a pitch which is constant within the section but has a difference from the pitch of the first element, the pitch difference at least of one of the sections being opposite in sign to a remainder of the sections and the pitch difference of another of the sections being at least double the pitch difference of two sections adjacent the another section, the second element being configured so that when screwed into the internal thread of the first element thread play and thread tolerances are compensated in the double pitch difference section and a load flank of one corner tooth of the double pitch difference section produces a basic bracing with a guide flank of another corner tooth of the section, the two adjacent sections being configured to have load and guide flanks that build thread bracing until a desired thread torque has been reached, wherein the section with a pitch difference which is at least double that of the adjacent sections extends at least over three helixes and the two adjacent sections extend over at least two helixes.

10. A pipe joint as defined in claim 9, wherein the section with a pitch difference which is at least double that of the adjacent sections extends over four helixes.

11. A pipe joint as defined in claim 9, wherein the spigot thread and the sleeve are designed as multiple start threads.

12. A pipe joint as defined in claim 11, wherein the spigot and sleeve threads are double-start threads.

13. A pipe joint as defined in claim 9, wherein the pitch difference between the two screwed-together elements is at least 0.0005 mm/inch and at most 0.4 mm/inch.

* * * * *